US006741409B2

(12) United States Patent
Blackwell

(10) Patent No.: US 6,741,409 B2
(45) Date of Patent: May 25, 2004

(54) PRECISION ALIGNMENT OF OPTICAL DEVICES

(75) Inventor: Donald A. Blackwell, Saratoga, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/264,431

(22) Filed: Oct. 4, 2002

(65) Prior Publication Data

US 2004/0066567 A1 Apr. 8, 2004

(51) Int. Cl.[7] .................................................. G02B 7/02
(52) U.S. Cl. ....................................................... 359/822
(58) Field of Search ................................ 359/819, 822, 359/811; 385/88, 90, 92

(56) References Cited

U.S. PATENT DOCUMENTS

| | | | | | |
|---|---|---|---|---|---|
| 3,711,723 | A | * | 1/1973 | McMurtry | 250/566 |
| 3,735,142 | A | * | 5/1973 | Harr et al. | 235/462.45 |
| 4,586,237 | A | * | 5/1986 | Bandura et al. | 29/566.3 |
| 6,325,551 | B1 | | 12/2001 | Williamson III et al. | |
| 6,431,766 | B1 | | 8/2002 | Randle | |
| 6,435,735 | B1 | | 8/2002 | Ramsey | |
| 2003/0042921 | A1 | * | 3/2003 | Hollman | 324/754 |

* cited by examiner

*Primary Examiner*—Ricky Mack
(74) *Attorney, Agent, or Firm*—Workman Nydegger

(57) ABSTRACT

A method and apparatus for optical aligning an electrical assembly includes inserting leads of an electrical assembly into guide holes of a nosepiece; guiding the leads exiting the nosepiece into a contact barrel; pressing the exiting leads with spring contacts that are electrically coupled to the leads; and moving the spring contacts along the leads to urge the electrical assembly toward the nosepiece.

16 Claims, 3 Drawing Sheets

PRECISION ALIGNMENT OF OPTICAL DEVICES

TECHNICAL FIELD

This disclosure relates to precise alignment of optical devices.

BACKGROUND

High-speed communications often utilize opto-electronic (OE) devices. The opto-electronic devices on the receiver and transmitter sides of the communication system must be fabricated with a high degree of accuracy. Often the size of the communications systems may require that the opto-electronic devices be fabricated in large numbers. Assembly of the fiber optic filament and the devices typically requires that the device and fiber be coupled mechanically and optically. Typically this may involve sub-micron accuracy, performed manually by skilled technicians working with microscopes and high-precision manipulators. Once each opto-electronic device is assembled, it may be tested electrically to verify proper performance. Then the device is may be mounted onto a printed circuit board for connection to other electronic and optical signal processing components. Optical devices, such as lasers used in optical transmitters and photodiodes used in optical receivers, may be aligned during assembly to improve performance of the devices.

A critical step in the assembly of transmitter and receiver optical subassemblies (TOSA & ROSA) is the bonding of the devices to their housings. This step involves an active alignment (i.e. the TOSA/ROSA is operating during alignment) to close tolerances. Small variations in alignment may result in significant degradation of the opto-electronic device. To achieve this precise alignment and enable consistency of alignment between devices, the subassembly should be held in such a manner as to assure little or no movement in any of the horizontal or perpendicular axes.

SUMMARY

In one aspect, a method of optical alignment an electrical assembly is disclosed that includes inserting leads of the electrical assembly into guide holes of a nosepiece; guiding the leads exiting the nosepiece into a contact barrel; pressing the exiting leads with spring contacts that are electrically coupled to the leads; and moving the spring contacts along the leads to urge the electrical assembly toward the nosepiece. The aforesaid method may also include causing the movement of the spring contacts by gas pressure.

In second aspect, an apparatus for optical alignment of an electrical assembly is disclosed that includes a support block and a nosepiece located a fixed distance from the support block and including guide holes for electrical leads. Also included is a contact barrel movable between the support block and the nosepiece and a spring contact attached to the contact barrel and positioned to contact an electrical lead that exits the nosepiece wherein movement of the contact barrel causes the spring contact to move along the electrical lead.

The details of one or more embodiments are set forth in the accompanying drawings and the description below. Other features and advantages will be apparent from the description, drawings and the claims.

BRIEF DESCRIPTION OF DRAWINGS

Like reference symbols in the various drawings indicate like elements.

DETAILED DESCRIPTION

Figure 1B:
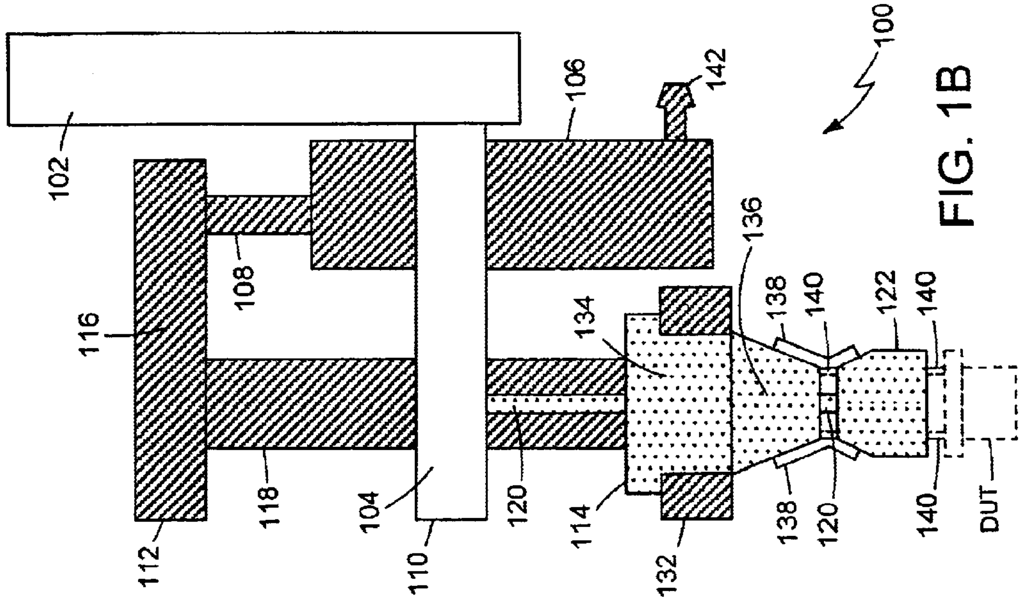
FIGS. 1A–1B illustrate a side view and a front view, respectively, of a precision alignment tool.
Figure 1A:
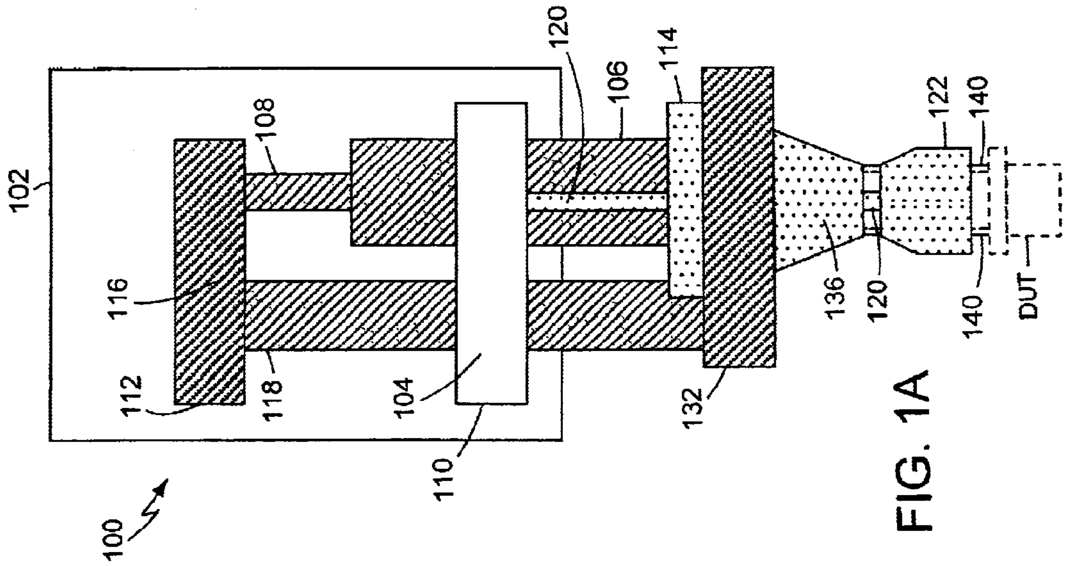

FIGS. 1A–1B illustrate a front view and a side view, respectively, of a precision alignment tool 100. The alignment tool 100 includes a support subassembly 110, an actuator subassembly 112 and a grip module subassembly 114.

Support subassembly 110 has a support plate 104 attached orthogonally to a mounting plate 102. The mounting plate 102 may have holes, clips, pins or other such features for attaching the mounting plate 102 to an assembly fixture (not shown). The support plate 104 holds a gas actuator 106 capable of utilizing pressurized gas to cause movement of a cross-head plate 116 and including a pressure rod 108 coupled to the cross-head plate 116. The gas actuator 106 may also include a gas port 142 for coupling of the gas actuator 106 to a source of pressurized gas (not shown). The support plate 104 also holds the actuator subassembly 112 and the grip module subassembly 114.

The actuator subassembly 112 has an actuator rod 118 with an upper end coupled to the cross-head plate 116. The lower end of the actuator rod is coupled to a clamp block 132 that retains the grip module assembly 114.

The grip module assembly 114 has a contact barrel assembly 134 and a nosepiece 122. The lower end of a support rod 120 is connected to the nosepiece 122, and the upper end is connected to the support plate 104. For high-production usage, the grip module assembly 114 may be adapted for rapid replacement in the clamp block 132. Various configurations of the grip module assembly 114 may be used with different types of optical assemblies. The nosepiece 122 supports an optical assembly device under test (DUT). The grip module assembly 114 may also include a printed circuit board assembly or a connector (not shown) for coupling the alignment tool to the DUT and for providing receiving signals from the DUT.

Figure 2A:
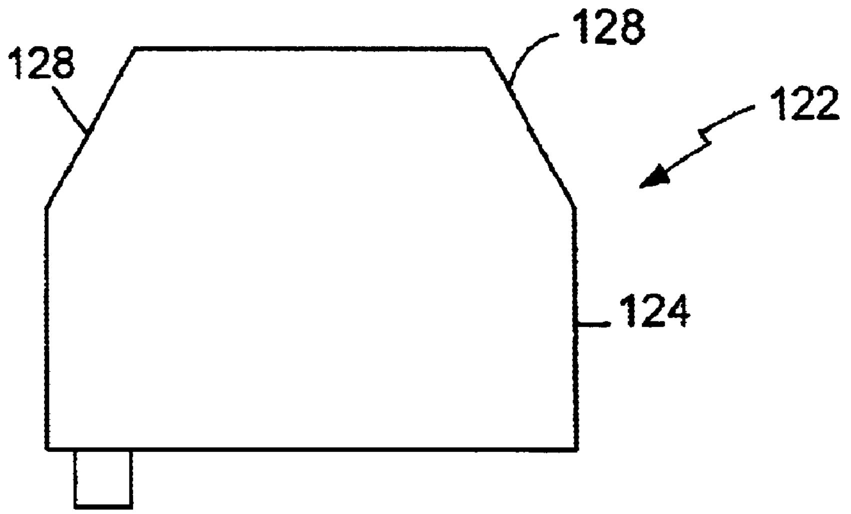
FIGS. 2A–2B illustrate a nosepiece of the tool of FIGS. 1A–1B.
Figure 2B:
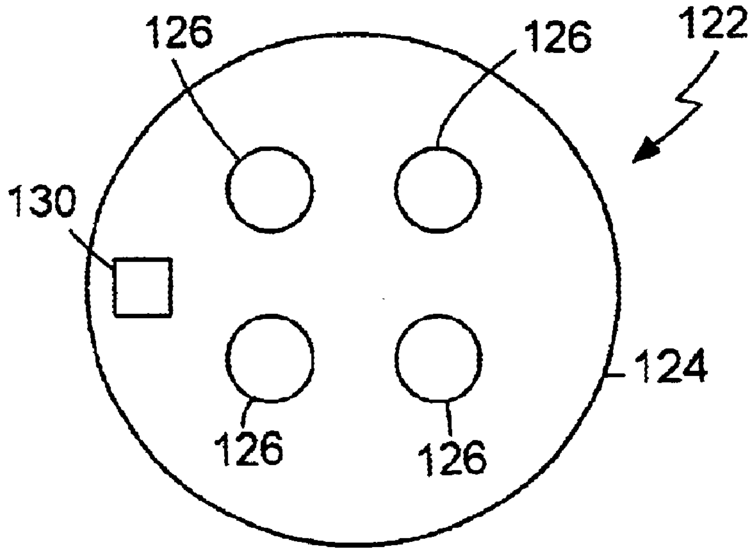

FIGS. 2A–2B illustrate an implementation of a nosepiece assembly 122. The nosepiece assembly may have a body 124 with guide holes 126 for guiding electrical leads of the DUT into the grip module assembly 114. The nosepiece may have any shape that is compatible with the DUT. The guide holes may have chamfers to aid in the insertion of the DUT electrical leads. The nosepiece may have a number of guide holes in any relationship as necessary for the electrical leads of the DUT. The guide holes may be used to guide the DUT electrical leads into the contact barrel assembly 134. The nosepiece body 124 also may have flats 128 that can guide the grip module assembly 114 into alignment with the nosepiece 122. The nosepiece may have one or more nubs 130 of various shapes and sizes or other surface features or characteristics such as roughness, scribe lines, ridges and so on, that can be adapted to mate with a suitable surface on the DUT to aid in alignment of the nosepiece with the DUT. In an embodiment, the nosepiece 122 may include three nubs defining an alignment plane of the DUT.

Referring again to FIGS. 1A–1B, the contact barrel assembly 134 may include a contact barrel 136. Spring contacts 138 are coupled to the contact barrel 136 and are arranged to provide electrical contact to the electrical leads 140 of the DUT. The contact barrel 136 further provides electrical coupling between the spring contacts 138 and the alignment station. The contact barrel assembly 134 is movable along support rod 120.

Figure 3:
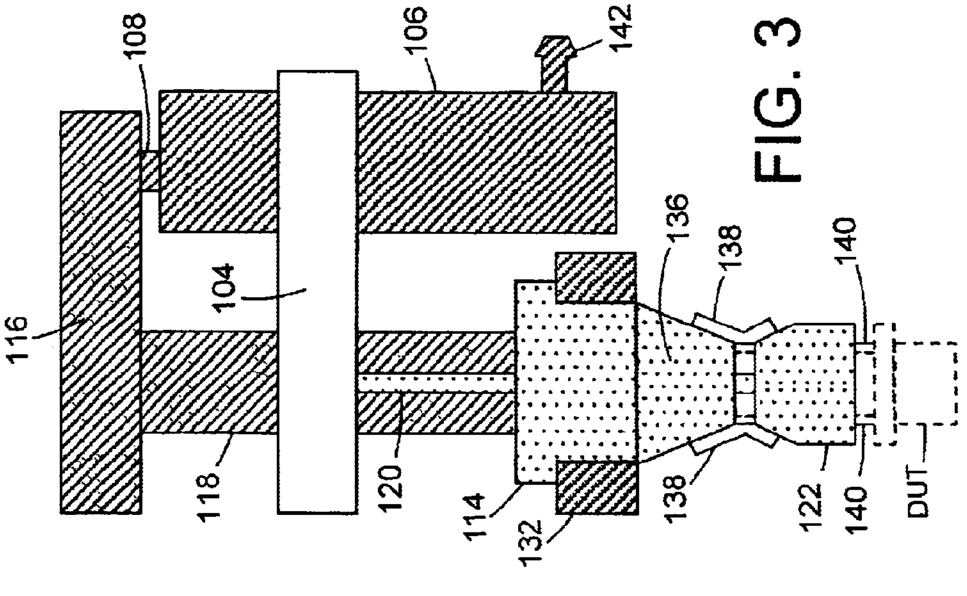
FIG. 3 illustrates the alignment tool of FIGS. 1A–1B in a load position.

FIG. 3 illustrates the alignment tool in a start or load/unload position of an alignment cycle. Pressurized gas applied to the pressure port 142 of gas actuator 106 causes pressure rod 108 to pull cross-head plate 116 toward the gas actuator. Movement of the cross-head plate causes the actuator rod 118 to move the clamp block 132 to the full down position. The grip module assembly 114, retained by the clamp block, also is moved to the load position.

In the load/unload position, a DUT may be installed in the alignment tool. The electrical leads of the DUT can be inserted into the nosepiece 122 guide holes. The guide holes guide the DUT electrical leads 140 into the contact barrel 136 where the leads are gripped by the spring contacts 138.

Figure 4:
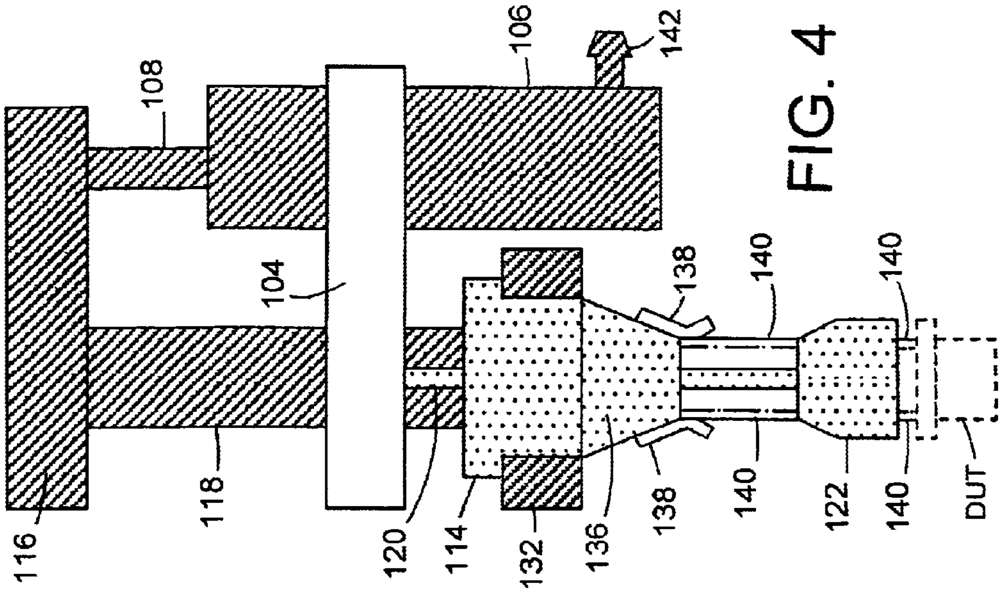
FIG. 4 illustrates the tool of FIGS. 1A–1B in a working position.

FIG. 4 illustrates the alignment tool in a working position. Pressure may be supplied by the gas actuator 106 which moves the cross-head plate 116 up which in turn moves the actuator 118 up. Movement of the actuator moves the clamp block 132 and, in turn, the grip module assembly 114, retained by the clamp block. The movement of the grip module assembly 114, including the contact barrel 136, is along the support rod 120 to the working position. The support rod holds the nosepiece 122 a fixed distance from the support plate 104. Hence, movement of the contact barrel along the support rod exposes the electrical leads 140 of the DUT between the nosepiece 122 and the contact barrel 136. In turn, spring contacts 138 slide along the DUT electrical leads. Pressure of the spring contacts sliding along the DUT electrical leads 140 tend to pull the DUT against the nosepiece and provide a holding force to retain the DUT in the alignment tool. The pressure of the contact springs may be selected to provide the holding and pulling force of the DUT so that the DUT is not damaged while maintaining electrical contact with the DUT electrical leads. The DUT is held in an alignment position against the nosepiece where the DUT may be precisely aligned.

Release of the gas pressure from the actuator 106 causes return of the alignment tool to the load/unload position of FIG. 3. The movement of the spring leads 138 down the DUT electrical leads tend to move the DUT away from the nosepiece. The DUT may be removed from the alignment tool and the tool is then ready for another load/unload alignment cycle.

Other implementations are within the scope of the following claims.

What is claimed is:

1. A method comprising:

inserting leads of an electrical assembly into guide holes of a nosepiece;

guiding the leads exiting the nosepiece into a contact barrel;

pressing the exiting leads with spring contacts that are electrically coupled to the leads; and moving the spring contacts along the leads to urge the electrical assembly toward the nosepiece.

2. The method of claim 1 comprising using gas pressure to move the spring contacts.

3. The method of claim 1 comprising moving the spring contacts along the leads to urge the electrical assembly away from the nosepiece.

4. The method of claim 1 comprising using spring pressure to move the spring contacts.

5. An apparatus comprising:

a support block;

a nosepiece located a fixed distance from the support block and including guide holes for electrical leads;

a contact barrel movable between the support block and the nosepiece; and a spring contact attached to the contact barrel and positioned to contact an electrical lead that exits the nosepiece wherein movement of the contact barrel causes the spring contact to move along the electrical lead.

6. The apparatus of claim 5 wherein the spring contact includes a leaf spring.

7. The apparatus of claim 5 further comprising a support rod having an upper end attached to the support block and a lower end attached to the nosepiece to align the movement of the contact barrel.

8. The apparatus of claim 5 wherein movement of the spring contact toward the support block urges the electrical assembly toward the nosepiece.

9. The apparatus of claim 5 wherein the nosepiece includes a notch to orient the nosepiece with respect to the contact barrel.

10. The apparatus of claim 9 wherein the nosepiece includes flats to align the nosepiece with respect to the contact barrel.

11. The apparatus of claim 8 wherein movement of the spring contact toward the support block urges the electrical assembly out of the nosepiece.

12. The apparatus of claim 5 comprising a pressurized gas actuator coupled to the contact block to provide a force on the contact block.

13. The apparatus of claim 5 wherein the nosepiece has surface features adapted to mate with a suitable surface on the electrical assembly.

14. The apparatus of claim 13 wherein the nosepiece surface features include at least one nub.

15. The apparatus of claim 14 wherein there are three nubs arranged to define an alignment plane of the electrical assembly.

16. An apparatus comprising:

a mounting plate;

a support block attached to the mounting plate;

a nosepiece including guide holes for clerical leads;

a support rod having an upper end attached to the support block and a lower end attached to the nosepiece;

a contact barrel movable between the support block and the nosepiece along the support rod;

a spring contact attached to the contact barrel and positioned to contact an electrical lead that exits the nosepiece wherein movement of the contact barrel causes the spring contact to move along the electrical lead;

a gas actuator attached to the support block and including a pressure rod;

an actuator plate coupled to the gas actuator by the pressure rod said pressure rod movable in response to pressure changes in the gas actuator;

a grip clamp attached to the contact barrel;

an actuator rod having an upper end attached to the actuator plate and a lower end attached to the grip clamp; and wherein changes in gas pressure in the gas actuator causes the pressure rod to move the actuator plate actuator rod and the grip clamp; and wherein movement of the grip clamp causes the contact barrel to move along the support rod.

* * * * *

UNITED STATES PATENT AND TRADEMARK OFFICE

CERTIFICATE OF CORRECTION

PATENT NO. : 6,741,409 B2 
APPLICATION NO. : 10/264431
DATED : May 25, 2004
INVENTOR(S) : Donald A. Blackwell It is certified that error appears in the above-identified patent and that said Letters Patent is hereby corrected as shown below:

Column 1,
Line 22, after "the device" delete "is".

Column 4,
Line 41, before "leads" change "clerical" to -- electrical --.

Signed and Sealed this

Eleventh Day of July, 2006

JON W. DUDAS
*Director of the United States Patent and Trademark Office*